(12) United States Patent
Yasuoka et al.

(10) Patent No.: US 11,089,155 B2
(45) Date of Patent: Aug. 10, 2021

(54) INFORMATION PROCESSING APPARATUS AND INFORMATION PROCESSING SYSTEM

(71) Applicant: FUJIFILM Business Innovation Corp., Tokyo (JP)

(72) Inventors: Daisuke Yasuoka, Kanagawa (JP); Yuta Nakayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 112 days.

(21) Appl. No.: 16/182,623

(22) Filed: Nov. 7, 2018

(65) Prior Publication Data

US 2019/0149660 A1    May 16, 2019

(30) Foreign Application Priority Data

Nov. 15, 2017   (JP) .............................. JP2017-220481

(51) Int. Cl.
*H04M 3/51*  (2006.01)
*H04M 3/42*  (2006.01)

(52) U.S. Cl.
CPC ....... *H04M 3/5108* (2013.01); *H04M 3/4211* (2013.01); *H04M 3/51* (2013.01)

(58) Field of Classification Search
CPC .... H04M 3/4211; H04M 3/51; H04M 3/5108; H04M 3/42

USPC .......................................... 379/266.1, 201.01
See application file for complete search history.

(56) References Cited

U.S. PATENT DOCUMENTS

| | | | |
|---|---|---|---|
| 6,438,471 B1* | 8/2002 | Katagishi | G07C 5/008 701/31.4 |
| 2004/0078721 A1* | 4/2004 | Williams | G06F 11/2294 714/46 |
| 2005/0187682 A1* | 8/2005 | Gault | G07C 5/008 701/29.6 |

FOREIGN PATENT DOCUMENTS

| JP | 2003283783 A | * 10/2003 |
|---|---|---|
| JP | 2015035728 | 2/2015 |
| JP | 2017167855 | 9/2017 |

\* cited by examiner

*Primary Examiner* — Harry S Hong
(74) *Attorney, Agent, or Firm* — JCIPRNET

(57) ABSTRACT

An information processing apparatus includes an obtaining unit that obtains a telephone number of a mobile terminal owned by a user and information regarding an external device operated by the user, an association unit that associates the telephone number and the information regarding the external device obtained by the obtaining unit with each other, and a provision unit that provides the information associated by the association unit for an apparatus corresponding to a telephone that receives a call from the mobile terminal before a line between the mobile terminal and the telephone is established.

6 Claims, 8 Drawing Sheets

INFORMATION PROCESSING APPARATUS AND INFORMATION PROCESSING SYSTEM

CROSS-REFERENCE TO RELATED APPLICATIONS

This application is based on and claims priority under 35 USC 119 from Japanese Patent Application No. 2017-220481 filed Nov. 15, 2017.

BACKGROUND

(i) Technical Field

The present disclosure relates to an information processing apparatus and an information processing system.

(ii) Related Art

A mobile terminal apparatus disclosed in Japanese Unexamined Patent Application Publication No. 2015-35728 is an example of apparatuses that display information regarding malfunctions of image forming apparatuses to users. The mobile terminal apparatus obtains device information and error information and transmits the obtained device information and error information to a server. The server generates guidance display data on the basis of the received device information and error information from an image forming apparatus and transmits the generated guidance display data to the mobile terminal apparatus. The guidance display data includes the device information, the error information, and information indicating a procedure for addressing an error. The mobile terminal apparatus receives the guidance display data transmitted from the server and displays the information included in the received guidance display data.

SUMMARY

When an operator gives an explanation to a user by telephone, the operator hears what the user desires to know. The operator then searches, using a terminal, for information necessary to the user in accordance with what the user has said and explains to the user on the basis of the found information. Since the operator hears what the user desires to know and then searches for information in accordance with what the user has said, it undesirably takes time to give an explanation to the user.

Aspects of non-limiting embodiments of the present disclosure relate to a technique for providing necessary information for an operator before the operator starts talking with a user by telephone.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an obtaining unit that obtains a telephone number of a mobile terminal owned by a user and information regarding an external device operated by the user, an association unit that associates the telephone number and the information regarding the external device obtained by the obtaining unit with each other, and a provision unit that provides the information associated by the association unit for an apparatus corresponding to a telephone that receives a call from the mobile terminal before a line between the mobile terminal and the telephone is established.

BRIEF DESCRIPTION OF THE DRAWINGS

An exemplary embodiment of the present disclosure will be described in detail based on the following figures, wherein.

DETAILED DESCRIPTION

Exemplary Embodiment

Overall Configuration

Figure 1:
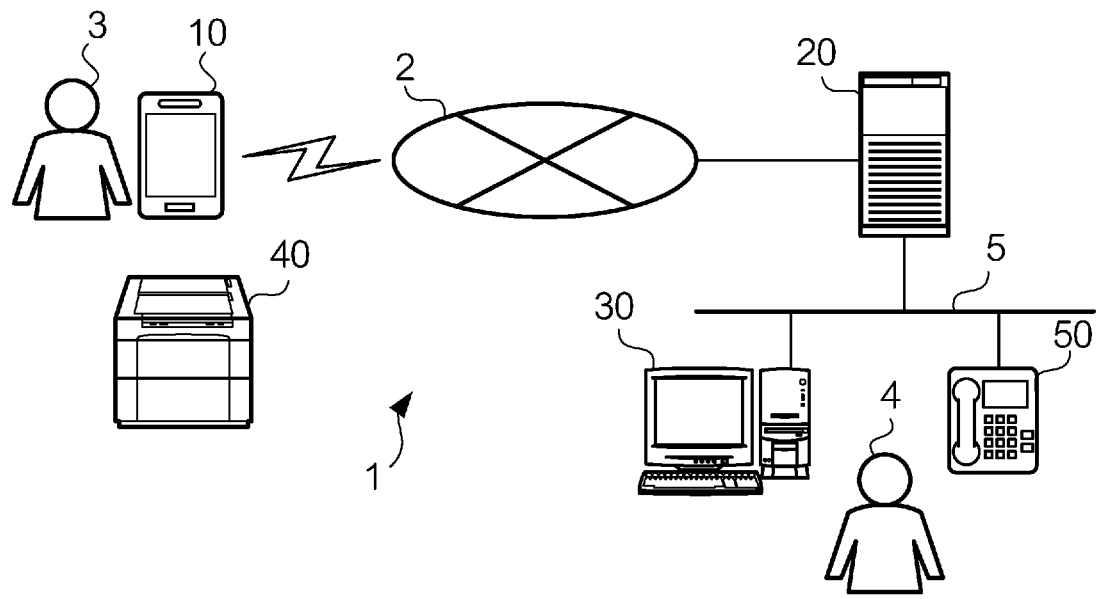
FIG. 1 is a diagram illustrating apparatuses included in an information processing system according to an exemplary embodiment of the present disclosure.

FIG. 1 is a diagram illustrating apparatuses included in an information processing system 1 according to an exemplary embodiment of the present disclosure. A communication line 2 includes a communication line, a fixed-line telephone network, and a mobile telephone network with which data communication is performed. An image forming apparatus 40 has a function of forming images on sheets, a function of scanning documents, a copy function, a facsimile function, a short-distance wireless communication function, and the like. The image forming apparatus 40 is an example of an external device in the present disclosure. The external device in the present disclosure is not limited to the image forming apparatus 40. For example, a home appliance or an electronic device used for business purposes may be used, instead.

A mobile terminal 10 is used by a user 3 of the image forming apparatus 40. In the present exemplary embodiment, the mobile terminal 10 is a smartphone. The mobile terminal 10 performs data communication and speech communication through a base station of the mobile telephone network included in the communication line 2. The mobile terminal 10 has a short-distance wireless communication function such as a wireless local area network (LAN), near-field communication (NFC), or Bluetooth (registered trademark) and performs data communication by accessing the image forming apparatus 40 through short-distance wireless communication. A plurality of mobile terminals 10 can perform communication through the communication line 2 in the present exemplary embodiment, but FIG. 1 illustrates only one mobile terminal 10 for simplicity. The mobile terminal 10 is not limited to a smartphone, and may be, for example, a tablet terminal or a laptop personal computer capable of performing speech communication and data communication, instead.

A terminal apparatus 30 is a desktop computer provided in a support center of the image forming apparatus 40. An operator 4 in the support center operates the terminal apparatus 30. The terminal apparatus 30 accesses a server apparatus 20 through a communication line 5 in the support center and performs data communication. The terminal apparatus 30 is not limited to a desktop computer, and may be a laptop computer, instead. A plurality of terminal apparatuses 30 are provided in the support center, but FIG. 1 illustrates only one terminal apparatus 30 for simplicity.

The server apparatus 20 has a computer telephony integration (CTI) function and is connected to the communication lines 2 and 5. The server apparatus 20 is an example of an information processing apparatus in the present disclosure. The server apparatus 20 performs data communication through the communication line 2 and stores information transmitted from the mobile terminal 10. The server apparatus 20 also assigns a call from the mobile terminal 10 through a telephone network to a telephone 50 used by the operator 4 through the communication line 5 and supplies the terminal apparatus 30 with information to be used by the operator 4 when the operator talks with the user 3 of the mobile terminal 10 by telephone. A plurality of operators 4 and a plurality of telephones 50 are provided in the support center, but FIG. 1 illustrates only one operator 4 and only one telephone 50 for simplicity.

Configuration of Server Apparatus 20

Figure 2:
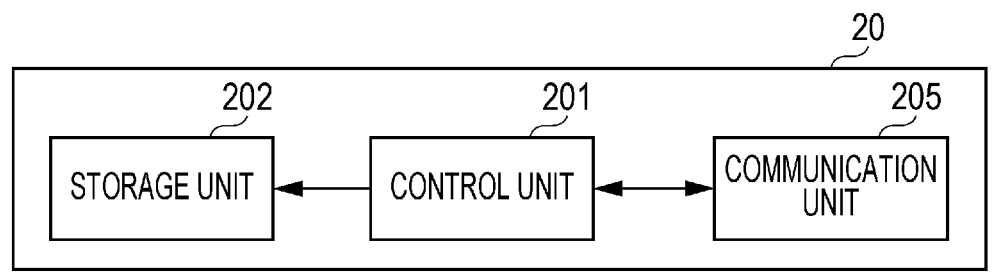
FIG. 2 is a diagram illustrating the hardware configuration of a server apparatus.

FIG. 2 is a block diagram illustrating an example of the hardware configuration of the server apparatus 20. A communication unit 205 is a communication interface for performing data communication and connected to the communication lines 2 and 5. The communication unit 205 has a switchboard function and assigns a call from the mobile terminal 10 to the telephone 50 connected to the communication line 5.

A storage unit 202 is a computer readable medium such as a hard disk drive. The storage unit 202 stores programs to be executed by a control unit 201. The storage unit 202 stores a first table TB1 storing information transmitted from the mobile terminal 10 and a second table TB2 storing information to be supplied to the terminal apparatus 30. The storage unit 202 is an example of a storage unit in the present disclosure.

Figure 3:
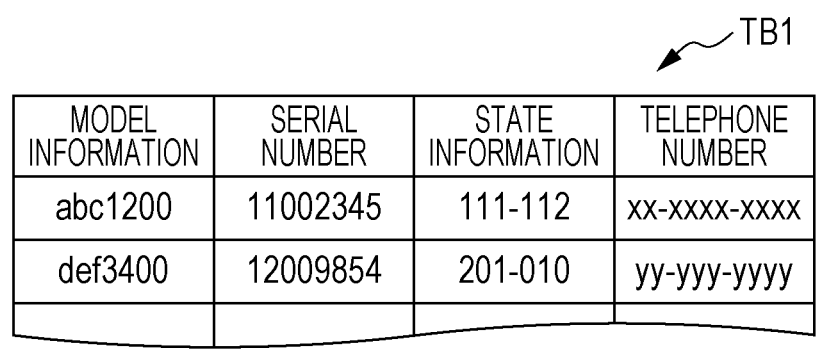
FIG. 3 is a diagram illustrating an example of a first table.

FIG. 3 is a diagram illustrating an example of the first table TB1. The first table TB1 includes a model information field, a serial number field, a state information field, which indicates a state of the image forming apparatus 40, and a telephone number field. The model information field stores model information, which indicates a model of the image forming apparatus 40, transmitted from the mobile terminal 10. The serial number field stores a serial number given to the image forming apparatus 40 and transmitted from the mobile terminal 10. The state information field stores state information, which indicates the state of the image forming apparatus 40, transmitted from the mobile terminal 10. In the present exemplary embodiment, the state information might include an error number for identifying an error that has occurred in the image forming apparatus 40. The state information might also include a menu number for identifying a menu screen displayed by the image forming apparatus 40. The telephone number field stores a telephone number transmitted from the mobile terminal 10.

Figure 4:
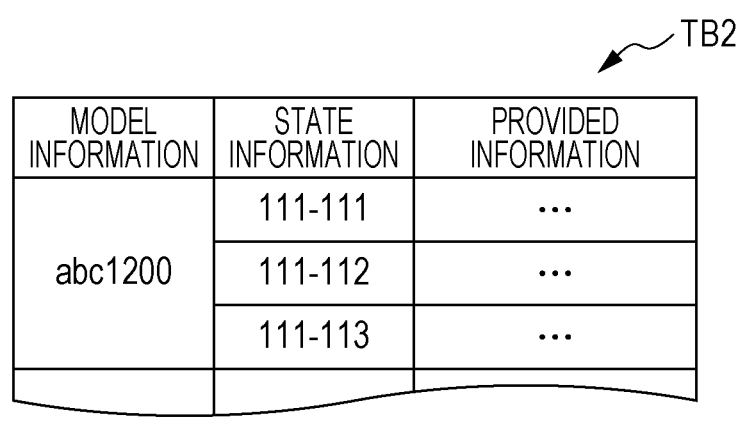
FIG. 4 is a diagram illustrating an example of a second table.

FIG. 4 is a diagram illustrating an example of the second table TB2. The second table TB2 includes a model information field, an error number field, and a provided information field. The second table TB2 is provided for each model of the image forming apparatus 40. The model information field stores model information, which indicates the model of the image forming apparatus 40. The state information field stores state information, which indicates the state of the image forming apparatus 40. The provided information field stores information corresponding to the state information stored in the same record. If the state information stored in the same record includes an error number, for example, the provided information field stores information indicating a method for addressing an error identified by the error number. If the state information stored in the same record includes a menu number, for example, the provided information field stores information indicating a method for operating a menu identified by the menu number.

The control unit 201 includes a central processing unit (CPU) and a memory. The memory is a computer readable memory such as a random-access memory (RAM). The functions of the server apparatus 20 are achieved by reading the programs stored in the storage unit 202 onto hardware such as the CPU and the memory, executing the programs using the CPU, operating the communication unit 205, and reading and/or writing information and signals using the memory and the storage unit 202.

Figure 5:
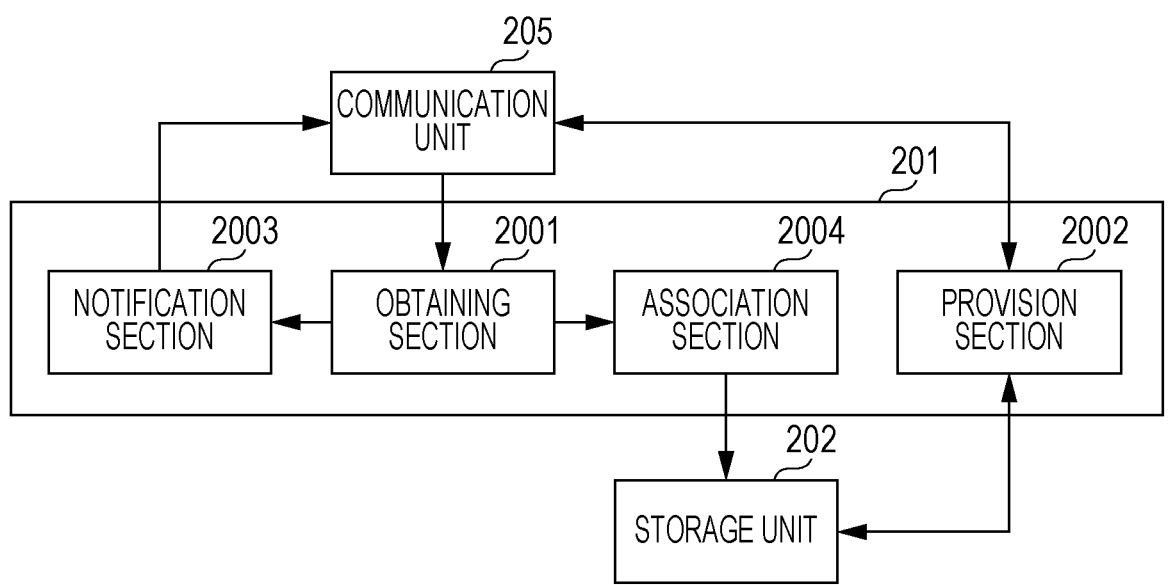
FIG. 5 is a functional block diagram illustrating the configuration of functions of the server apparatus.

FIG. 5 is a functional block diagram illustrating the configuration of functions in the present disclosure among the functions of the server apparatus 20. An obtaining section 2001 obtains information transmitted from the mobile terminal 10. The obtaining section 2001 is an example of an obtaining unit in the present disclosure. An association section 2004 associates the information obtained by the obtaining section 2001 and stores the information in the first table TB1. The association section 2004 is an example of an association unit in the present disclosure. A provision section 2002 provides the information obtained by the obtaining section 2001 for the terminal apparatus 30 operated by the operator 4 who uses the telephone 50 before a line between the mobile terminal 10 that makes a call and the telephone 50 that receives the call is established. The provision section 2002 is an example of a provision unit in the present disclosure. A notification section 2003 notifies the mobile terminal 10 that information transmitted from the mobile terminal 10 has been obtained. The notification section 2003 is an example of a notification unit in the present disclosure.

Figure 6:
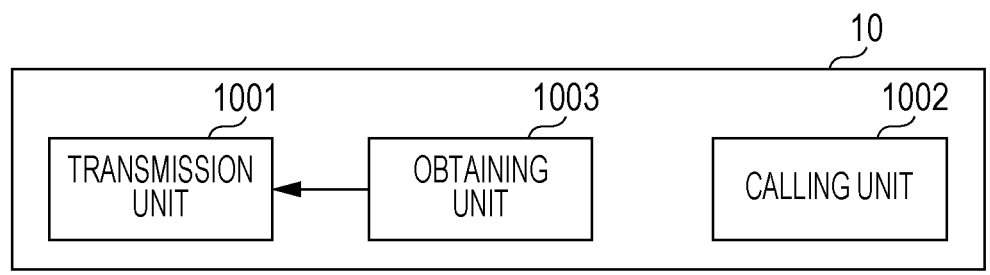
FIG. 6 is a functional block diagram illustrating the configuration of functions of a mobile terminal.

FIG. 6 is a functional block diagram illustrating the configuration of functions in the present disclosure among the functions of the mobile terminal 10. A transmission unit 1001 transmits model information, a serial number, and state information obtained from the image forming apparatus 40 and a telephone number of the mobile terminal 10 to the server apparatus 20. The transmission unit 1001 is an example of a transmission unit in the present disclosure. A calling unit 1002 calls a predetermined telephone number. The calling unit 1002 is an example of a calling unit in the present disclosure. An obtaining unit 1003 obtains model information, a serial number, state information, and the like from the image forming apparatus 40 through short-distance wireless communication.

Example of Operation According to Exemplary Embodiment

An example of an operation according to the present exemplary embodiment will be described hereinafter. The mobile terminal 10 stores an application program for using a service provided by the support center of the image forming apparatus 40. The user 3 performs an operation for executing the application program using the mobile terminal 10, and the mobile terminal 10 executes the application program. After the mobile terminal 10 executes the application program, an icon for calling the support center of the image forming apparatus 40 is displayed on the mobile terminal 10. If the user 3 desires to receive an explanation of a method for addressing an error that has occurred in the image forming apparatus 40, the user 3 taps the icon for calling the support center. If the icon for calling the support center is tapped, the mobile terminal 10 displays a screen illustrated in FIG. 7.

Figure 7:
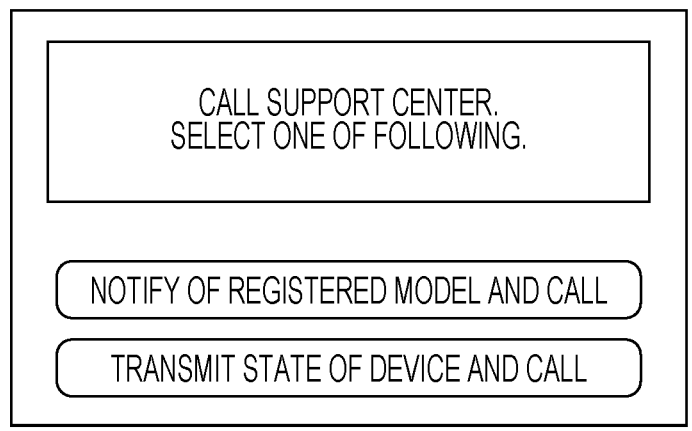
FIG. 7 is a diagram illustrating an example of a screen displayed by the mobile terminal.
Figure 8:
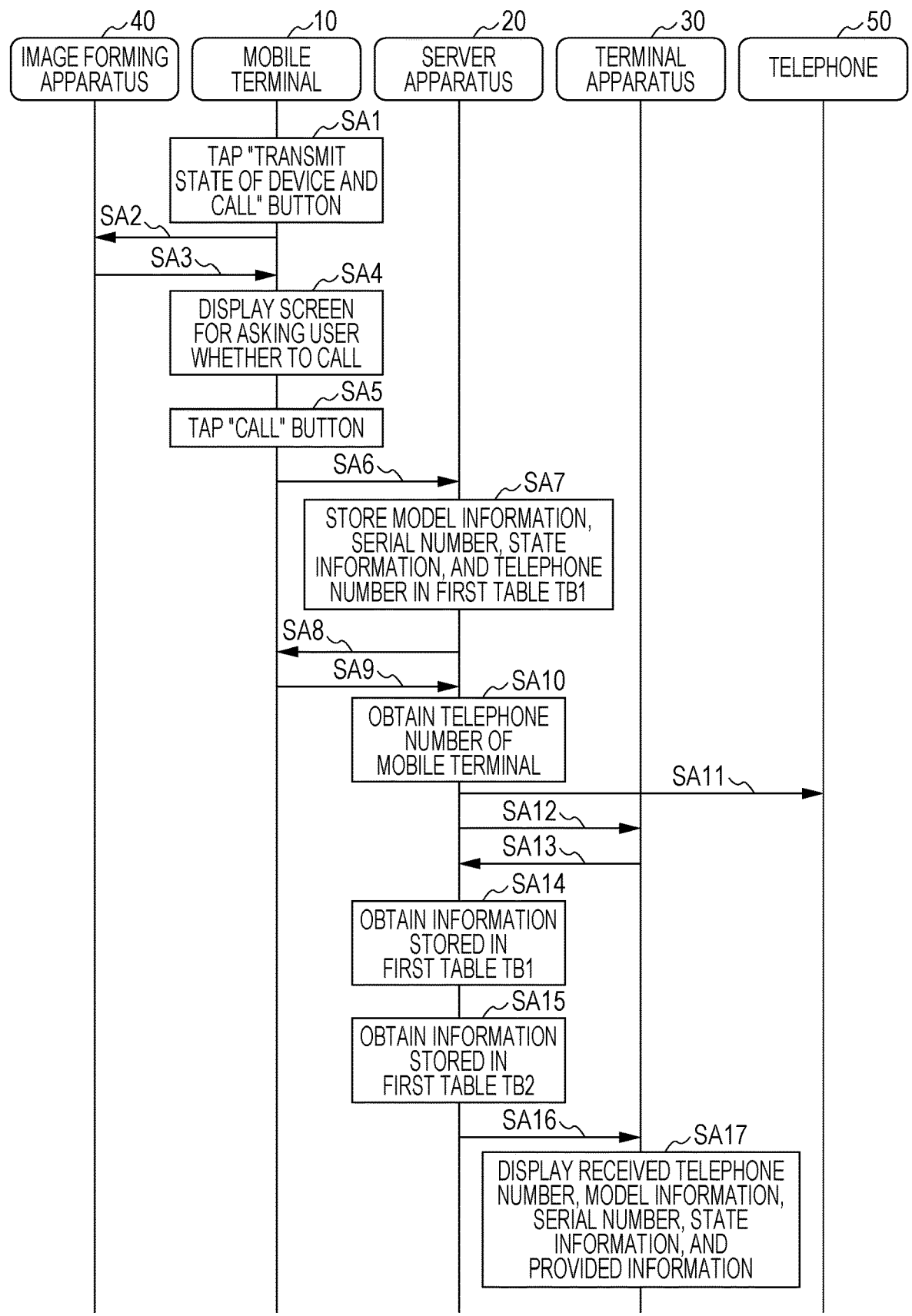
FIG. 8 is a sequence diagram illustrating an example of an operation according to the exemplary embodiment.

FIG. 8 is a sequence diagram illustrating the example of the operation according to the exemplary embodiment. If the user 3 taps a "transmit state of device and call" button illustrated in FIG. 7 (step SA1), the mobile terminal 10 (obtaining unit 1003) accesses the image forming apparatus 40 through short-distance wireless communication and requests model information, a serial number, and state information from the image forming apparatus 40 (step SA2). In response to the request from the mobile terminal 10, the image forming apparatus 40 transmits the model information, the serial number, and the state information to the mobile terminal 10 through short-distance wireless communication (step SA3). If an error has occurred in the image forming apparatus 40, the image forming apparatus 40 includes an error number in the state information. The mobile terminal 10 (obtaining unit 1003) obtains the model information, the serial number, and the state information transmitted from the image forming apparatus 40.

Figure 9:
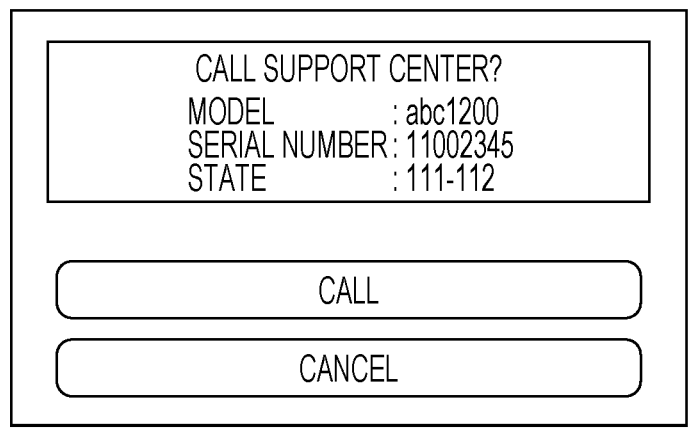
FIG. 9 is a diagram illustrating an example of a screen displayed by the mobile terminal.

Upon obtaining the model information, the serial number, and the state information, the mobile terminal 10 displays a screen for asking the user 3 whether to call the support center, the screen including the obtained model information, serial number, and state information (step SA4). FIG. 9 illustrates an example of a screen displayed by the mobile terminal 10 at this time. If the user 3 taps a displayed "call" button (step SA5), the mobile terminal 10 (transmission unit 1001) transmits a telephone number thereof and the model information, the serial number, and the state information obtained from the image forming apparatus 40 to the server apparatus 20 (step SA6).

The server apparatus 20 (obtaining section 2001) receives the model information, the serial number, the state information, and the telephone number transmitted from the mobile terminal 10, and the association section 2004 stores the received model information, serial number, state information, and telephone number in the first table TB1 (step SA7). After the model information, the serial number, the state information, and the telephone number are stored in the first table TB1, the server apparatus 20 (notification section 2003) transmits a message indicating an end of the storage to the mobile terminal 10 (step SA8).

Upon receiving the message transmitted from the server apparatus 20 in step SA8, the mobile terminal 10 (calling unit 1002) calls a predetermined telephone number of the support center (step SA9). The server apparatus 20 receives the call from the mobile terminal 10. After receiving the call from the mobile terminal 10, the server apparatus 20 obtains the telephone number of the mobile terminal 10 using a known caller number notification service (step SA10). After obtaining the telephone number, the server apparatus 20 selects, from among the plurality of telephones 50 connected to the communication line 5, a telephone 50 to which the call is to be assigned and assigns the call to the selected telephone 50 (step SA11). After obtaining the telephone number, the server apparatus 20 also transmits the obtained telephone number to a terminal apparatus 30 corresponding to the telephone 50 to which the call has been assigned, that is, a terminal apparatus 30 operated by an operator 4 who uses the telephone 50 to which the call has been assigned (step SA12). The call is assigned to, for example, a telephone 50 in the support center corresponding to the model information received by the mobile terminal 10.

Upon receiving the telephone number transmitted from the server apparatus 20, the terminal apparatus 30 transmits, to the server apparatus 20, a message for instructing the server apparatus 20 to provide information for the terminal apparatus 30, the message including the received telephone number (step SA13). The server apparatus 20 (provision section 2002) that has received the message obtains information stored in the first table TB1 using the telephone number included in the received message (step SA14). More specifically, the server apparatus 20 searches the first table TB1 for the telephone number included in the received message. If a record including the obtained telephone number is found, the server apparatus 20 obtains model information, a serial number, and state information stored in the record.

Next, the server apparatus 20 (provision section 2002) obtains information stored in the second table TB2 using the information obtained from the first table TB1 (step SA15). More specifically, the server apparatus 20 searches the second table TB2 storing the model information obtained from the first table TB1 for the state information obtained from the first table TB1. If a record including the state information is found, the server apparatus 20 obtains provided information stored in the record from the second table TB2.

Next, the server apparatus 20 (provision section 2002) transmits the model information, the serial number, and the state information obtained from the first table TB1 and the provided information obtained from the second table TB2 to the terminal apparatus 30 that has transmitted the message (step SA16). The terminal apparatus 30 receives the model information, the serial number, the state information, and the provided information transmitted from the server apparatus 20 and displays the received telephone number, model information, serial number, state information, and provided information (step SA17). After the telephone number, the model information, the serial number, the state information, and the provided information are displayed on the terminal apparatus 30 operated thereby, the operator 4 takes a receiver of the telephone 50 to start talking with the user 3 of the mobile terminal 10.

According to the present exemplary embodiment, unlike a case where the operator 4 obtains information regarding the image forming apparatus 40 from the user 3 though conversation, searches for information regarding the image forming apparatus 40 on the basis of the obtained information using the terminal apparatus 30, and gives an explanation to the user 3 using the found information, information regarding the image forming apparatus 40 used by the user 3 is displayed on the terminal apparatus 30 used by the operator 4 before the user 3 starts talking with the operator 4 by telephone, and the operator 4 obtains in advance information used to give an explanation to the user 3 from the displayed information.

Figure 10:
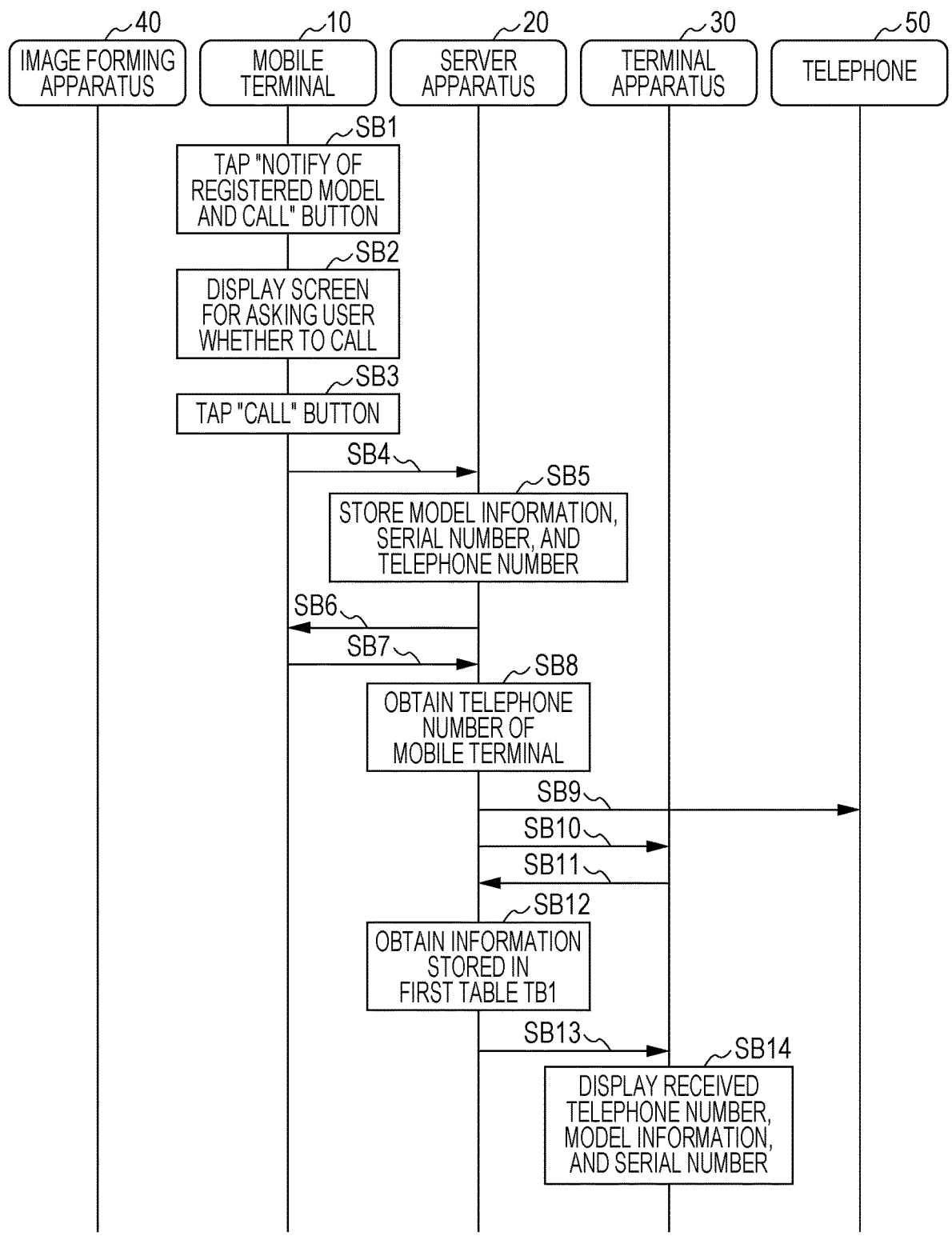
FIG. 10 is a sequence diagram illustrating another example of the operation according to the exemplary embodiment.

Next, an example of an operation when the user 3 has tapped a "notify of registered model and call" button in the screen illustrated in FIG. 7 will be described with reference to a sequence diagram of FIG. 10. In the present exemplary embodiment, the user 3 operates the mobile terminal 10 that has executed the application program and registers model information regarding the image forming apparatus 40 used thereby and a serial number of the image forming apparatus 40 to the mobile terminal 10 in advance.

Figure 11:
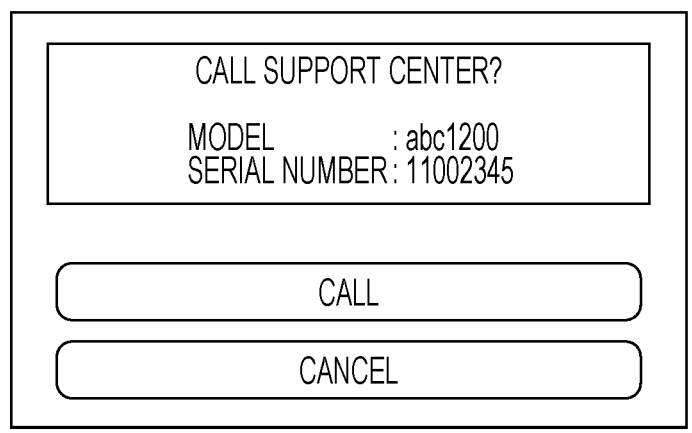
FIG. 11 is a diagram illustrating an example of a screen displayed by the mobile terminal.

If the user 3 taps the "notify of registered model and call" button in the screen illustrated in FIG. 7 (step SB1), the mobile terminal 10 displays a screen for asking the user 3 whether to call the support center, the screen including the model information and the serial number registered by the user 3 in advance (step SB2). FIG. 11 illustrates another example of the screen displayed by the mobile terminal 10. If the user 3 taps a displayed "call" button (step SB3), the mobile terminal 10 transmits, to the server apparatus 20, the telephone number thereof and the model information and the serial number registered by the user 3 in advance (step SB4).

The server apparatus 20 receives the model information, the serial number, and the telephone number transmitted from the mobile terminal 10, and the association section 2004 stores the received model information, serial number, and telephone number in the first table TB1 (step SB5). After the model information, the serial number, and the telephone number are stored in the first table TB1, the server apparatus 20 transmits a message indicating an end of the storage to the mobile terminal 10 (step SB6).

Upon receiving the message transmitted from the server apparatus 20 in step SB6, the mobile terminal 10 calls the predetermined telephone number of the support center (step SB7). The server apparatus 20 receives the call from the mobile terminal 10. After receiving the call from the mobile terminal 10, the server apparatus 20 obtains the telephone number of the mobile terminal 10 using a known caller number notification service (step SB8). After obtaining the telephone number, the server apparatus 20 selects, from among the plurality of telephones 50 connected to the communication line 5, a telephone 50 to which the call is to be assigned and assigns the call to the selected telephone 50 (step SB9). After obtaining the telephone number, the server apparatus 20 also transmits the obtained telephone number to a terminal apparatus 30 corresponding to the telephone 50 to which the call has been assigned, that is, a terminal apparatus 30 operated by an operator 4 who uses the telephone 50 to which the call has been assigned (step SB10).

Upon receiving the telephone number transmitted from the server apparatus 20, the terminal apparatus 30 transmits, to the server apparatus 20, a message for instructing the server apparatus 20 to provide information for the terminal apparatus 30, the message including the received telephone number (step SB11). The server apparatus 20 that has received the message obtains information stored in the first table TB1 using the telephone number included in the received message (step SB12). More specifically, the server apparatus 20 searches the first table TB1 for the telephone number included in the received message. If a record including the obtained telephone number is found, the server apparatus 20 obtains model information and a serial number stored in the record. Because the server apparatus 20 does not receive state information and store the state information in the first table TB1 when storing the model information, the serial number, and the telephone number transmitted from the mobile terminal 10 in the first table TB1 in step SB5, the server apparatus 20 does not obtain state information from the first table TB1.

If state information is not stored in the found record, the server apparatus 20 transmits the model information and the serial number obtained from the first table TB1 to the terminal apparatus 30 that has transmitted the message (step SB13). The terminal apparatus 30 receives the model information and the serial number transmitted from the server apparatus 20 and displays the received telephone number, model information, and serial number (step SB14). After the telephone number, the model information, and the serial number are displayed on the terminal apparatus 30 operated thereby, the operator 4 takes the receiver of the telephone 50 to start talking with the user 3 of the mobile terminal 10.

Modifications

Although an exemplary embodiment of the present disclosure has been described, the present disclosure is not limited to the exemplary embodiment and may be implemented in other various modes. For example, the present disclosure may be implemented by modifying the above-described exemplary embodiment in the following manners. The exemplary embodiment and the following modifications may be combined with each other.

Although the server apparatus 20 transmits information stored in the first table TB1 and information stored in the second table TB2 or information stored in the first table TB1 to the terminal apparatus 30 after receiving a message for instructing the server apparatus 20 to provide information for the terminal apparatus 30, a configuration for transmitting information stored in the first table TB1 and information stored in the second table TB2 or information stored in the first table TB1 to the terminal apparatus 30 is not limited to that according to the exemplary embodiment. For example, after assigning a call from the mobile terminal 10 to a telephone 50 in step SA11, the server apparatus 20 searches the first table TB1 for the telephone number obtained in step SA10. If a record storing the obtained telephone number is found, the server apparatus 20 obtains model information, a serial number, and state information stored in the record. The server apparatus 20 then searches the second table TB2 storing the model information obtained from the first table TB1 for the state information obtained from the first table TB1. If a record storing the state information is found, the server apparatus 20 obtains provided information stored in the record from the second table TB2. The server apparatus 20 then transmits the model information, the serial number, and the state information obtained from the first table TB1 and the provided information obtained from the second table TB2 to the terminal apparatus 30 operated by the operator 4 who uses the telephone 50 to which the call has been assigned. The terminal apparatus 30 displays the telephone number, the model information, the serial number, the state information, and the provided information transmitted from the server apparatus 20. With this configuration, steps SA12 and SA13 are not performed unlike in the above-described exemplary embodiment, and the terminal apparatus 30 displays the telephone number, the model information, the serial number, the state information, and the provided information earlier.

In the present exemplary embodiment, the server apparatus 20 may perform step SA11 after steps SA12 to SA17, instead.

Although the server apparatus 20 transmits a serial number to the terminal apparatus 30 and the terminal apparatus 30 displays the received serial number in the exemplary embodiment, the server apparatus 20 need not transmit a serial number to the terminal apparatus 30 and the terminal apparatus 30 need not display a serial number.

In the present disclosure, when assigning a call from the mobile terminal 10 to a telephone 50, the server apparatus 20 may obtain state information associated with the obtained telephone number from the first table TB1 and select a telephone 50 to which the call is to be assigned in accordance with the obtained state information, instead. If the obtained state information includes an error number and an error identified by the error number relates to an image forming engine, for example, the server apparatus 20 may assign the call to a telephone 50 used by the operator 4 who is in charge of explaining errors in the image forming engine. If an error identified by the error number relates to a paper feed mechanism, the server apparatus 20 may assign the call to a telephone 50 used by the operator 4 who is in charge of explaining errors in the paper feed mechanism.

In the above-described exemplary embodiment, state information may indicate a state of a device. For example, state information may indicate, as a state of a device, an open/close state of a cover of the image forming apparatus 40 or a state of a toner cartridge.

In the present disclosure, the server apparatus 20 may store information transmitted form the mobile terminal 10 in the first table TB1 and then transmit the information stored in the first table TB1 and information stored in the second table TB2 or the information stored in the second table TB2 to the terminal apparatus 30 before a call is received from the mobile terminal 10. For example, the server apparatus 20 stores model information, a serial number, state information, and a telephone number transmitted from the mobile terminal 10 in the first table TB1 in step SA7 and then searches the second table TB2 storing the stored model information for the state information stored in the first table TB1. If a record storing the state information is found, the server apparatus 20 obtains provided information stored in the record from the second table TB2. The server apparatus 20 then transmits the model information, the serial number, the state information, and the telephone number received from the mobile terminal 10 and the provided information obtained from the second table TB2 to each of the plurality of terminal apparatuses 30 connected to the communication line 5. The terminal apparatus 30 associates the information transmitted from the server apparatus 20 with one another and stores the information.

The terminal apparatus 30 stores the model information, the serial number, the state information, the telephone number, and the provided information transmitted from the server apparatus 20. If the server apparatus 20 receives a call from the mobile terminal 10, the server apparatus 20 selects a telephone 50 to which the call is to be assigned and assigns the call to the selected telephone 50. The server apparatus 20 also transmits, to the terminal apparatus 30 operated by the operator 4 who uses the telephone 50 to which the call has been assigned, the telephone number of the mobile terminal 10 that has made the call. Upon receiving the telephone number, the terminal apparatus 30 displays model information, a serial number, state information, and provided information associated with the received telephone number. If the terminal apparatus 30 does not receive the stored telephone number from the server apparatus 20 in a predetermined period of time after storing the model information, the serial number, the state information, the telephone number, and the provided information transmitted from the server apparatus 20, the terminal apparatus 30 may delete the stored model information, serial number, state information, telephone number, and provided information.

In the present disclosure, if receiving a call, the server apparatus 20 may store information provided for the terminal apparatus 30 as a history along with a telephone number of a caller. If receiving a call from the mobile terminal 10, the server apparatus 20 may transmit information stored as a history along with a telephone number of a caller to a terminal apparatus 30 operated by an operator 4 who uses a telephone 50 to which the call has been assigned, and the terminal apparatus 30 may display the received information.

In the present disclosure, the mobile terminal 10 may obtain an image generated by the image forming apparatus 40 and transmits the obtained image to the server apparatus 20. For example, the mobile terminal 10 may transmit an image generated by the image forming apparatus 40 using the scanning function to the server apparatus 20 or may transmit an image of a document read by the image forming apparatus 40 during copying to the server apparatus 20. The server apparatus 20 may store the image transmitted from the mobile terminal 10 and, if receiving a call from the mobile terminal 10, transmit the stored image to a terminal apparatus 30 operated by an operator 4 who uses a telephone 50 to which the call has been assigned.

In the present disclosure, when transmitting a telephone number thereof to the server apparatus 20 in step SA6 or SB4, the mobile terminal 10 may also transmit, to the server apparatus 20, other telephone numbers registered in advance. The server apparatus 20 may store the plurality of telephone numbers transmitted from the mobile terminal 10 in the telephone number field of the first table TB1. For example, the user 3 registers telephone numbers of fixed-line telephones in his/her office to the mobile terminal 10 in advance, and the mobile terminal 10 transmits the registered telephone numbers of the fixed-line telephones to the server apparatus 20 in step SA6 or SB4 along with the telephone number thereof. If receiving a call from one of the fixed-line telephones, the server apparatus 20 may obtain the telephone number of the fixed-line telephone and perform steps SA11 and later or steps SB9 and later.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor, configured to:
obtain a telephone number of a mobile terminal owned by a user and information regarding an external device operated by the user;
associate the obtained telephone number and the obtained information regarding the external device with each other as an associated information; and
provide the associated information for an apparatus corresponding to a telephone that receives a call from the mobile terminal before a line between the mobile terminal and the telephone is established,
wherein, before the telephone receives the call, the processor is further configured to provide the obtained information for a terminal apparatus corresponding to the telephone.

2. The information processing apparatus according to claim 1,
wherein the processor is further configured to obtain a plurality of telephone numbers.

3. The information processing apparatus according to claim 1, wherein the obtained information includes state information indicating a state of the external device, and wherein the processor is further configured to provide information associated with the state indicated by the state information.

4. The information processing apparatus according to claim 1, wherein the processor is further configured to:

associate the information provided by the provision unit with the telephone number and store the information and the telephone number as a history, and provide the information in the history associated with the telephone number used for the call.

5. An information processing system comprising:

a mobile terminal owned by a user including
  a transmitter that transmits a telephone number of the mobile terminal and information regarding an external device operated by the user, and
  a calling circuit that calls a predetermined telephone number; and an information processing apparatus including
  a processor configured to:
    obtain the telephone number and the information regarding the external device transmitted from the transmitter,
    associate the obtained telephone number and the obtained information regarding the external device with each other as an associated information, and
    provide the associated information for an apparatus corresponding to a telephone that receives a call from the mobile terminal before a line between the mobile terminal and the telephone is established wherein, before the telephone receives the call, the processor is further configured to provide the obtained information for a terminal apparatus corresponding to the telephone.

6. An information processing apparatus comprising:

obtaining means for obtaining a telephone number of a mobile terminal owned by a user and information regarding an external device operated by the user;

association means for associating the telephone number obtained by the obtaining means and the information regarding the external device with each other; and provision means for providing the information associated by the association means for an apparatus corresponding to a telephone that receives a call from the mobile terminal before a line between the mobile terminal and the telephone is established, wherein, before the telephone receives the call, the provision means provides the information obtained by the obtaining means for a terminal apparatus corresponding to the telephone.

* * * * *